United States Patent [19]

Bishop et al.

[11] Patent Number: 4,965,821
[45] Date of Patent: Oct. 23, 1990

[54] CELLULAR MOBILE RADIOTELEPHONE-BASED SYSTEM FOR RENTAL OF MOBILE EQUIPMENT

[75] Inventors: Ronald D. Bishop; Paul Hoberg, both of Mission Viejo,, Calif.

[73] Assignee: GTE Mobilnet Incorporated, Houston, Tex.

[21] Appl. No.: 289,079

[22] Filed: Dec. 23, 1988

[51] Int. Cl.$^5$ .......................... H04M 1/57; H04Q 7/04
[52] U.S. Cl. ......................................... 379/91; 379/58; 379/59; 379/60
[58] Field of Search ........................ 379/58, 59, 60, 91

[56] References Cited

U.S. PATENT DOCUMENTS

| | | | |
|---|---|---|---|
| 4,776,003 | 10/1988 | Harris | 379/91 |
| 4,803,348 | 2/1989 | Lohrey et al. | 225/381 |
| 4,831,647 | 5/1989 | D'Avello et al. | 379/91 |
| 4,845,636 | 7/1989 | Walker | 379/91 X |
| 4,845,740 | 7/1989 | Tokuyama et al. | 379/91 |

Primary Examiner—Jin F. Ng
Assistant Examiner—Stella L. Woo

[57] ABSTRACT

A system utilizing a cellular mobile radiotelephone and the public switching telecommunication network (PSTN) for entering into rental agreements and for accruing and billing the resulting rental charges associated with the rental of equipment, such as automobiles. The automobiles to be rented incorporate credit-card-activated, intelligent, cellular mobile radiotelephones. Upon entry into the automobile, a customer slides a card through a card reader included therein. The card reader transfers data encoded on the card to the radiotelephone whereupon the radio telephone establishes, via the PSTN, a communications link with a processor. In response to processor-originated voice prompts that the radiotelephone conveys to the customer, the customer then uses a keypad of the radiotelephone to enter data necessary to compose the rental agreement. Based on this data, as well as a renter profile included in a database accessible by the processor, the processor causes a rental agreement form to be printed at a location near the automobile. The customer then needs only to sign the completed written contract form at the exit location in order to drive away with the rental automobile. Upon return of the automobile, the customer enters a predetermined return code, which results in another call to the processor. Again, in response to processor-originated voice prompts, the customer enters data on the radiotelephone keypad in order to calculate rental charges. These charges are then automatically debited to an account indicated by the customer, and a written receipt is presented to the customer.

42 Claims, 5 Drawing Sheets

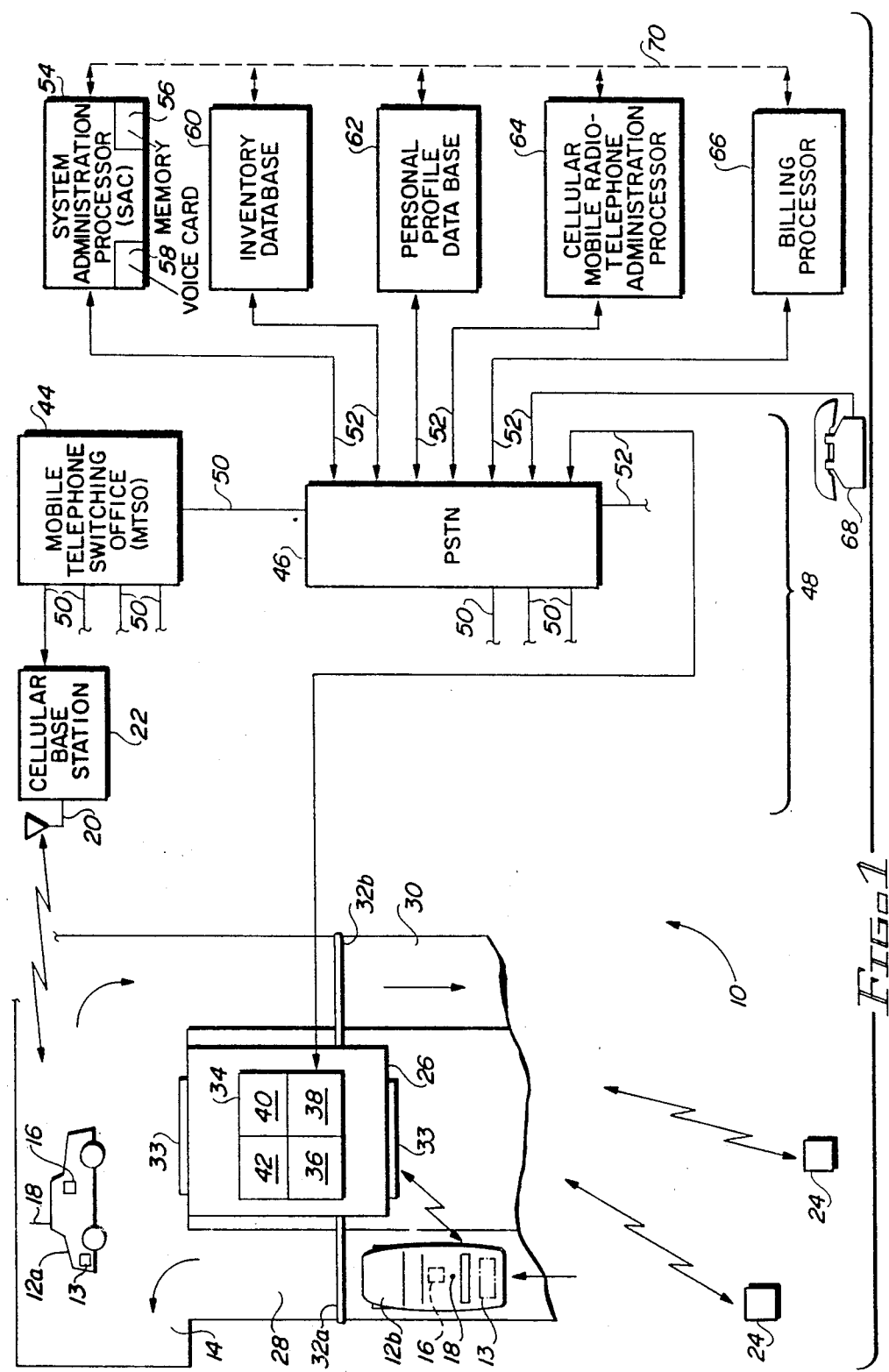

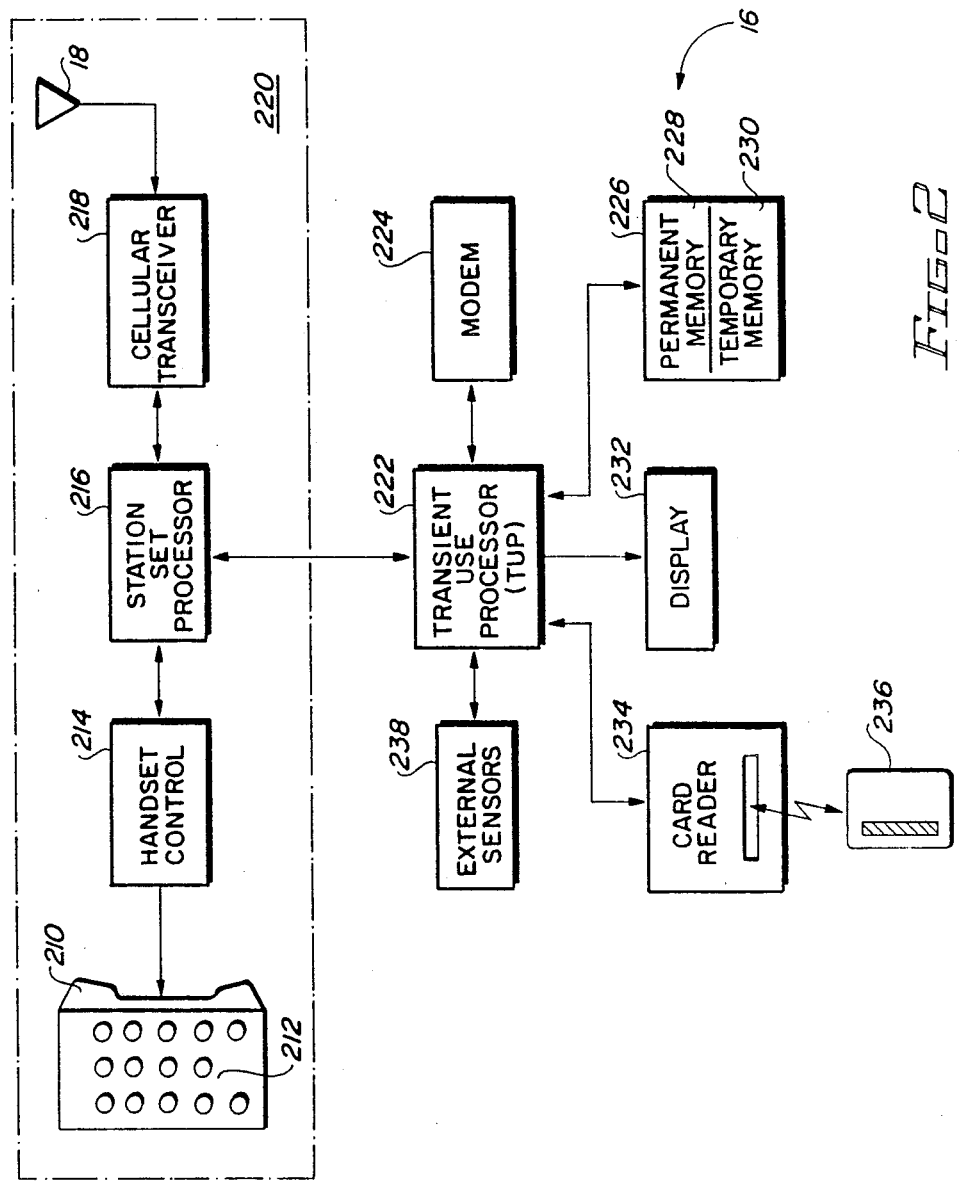

CELLULAR MOBILE RADIOTELEPHONE-BASED SYSTEM FOR RENTAL OF MOBILE EQUIPMENT

TECHNICAL FIELD OF THE INVENTION

The present invention relates generally to systems implemented to assist in the management and acquisition of information required by parties attempting to enter into agreements for the rental of equipment, such as automobiles. More specifically, the present invention relates to the use of a cellular mobile radiotelephone (CMR), with credit-card-reading capability, installed in rental equipment to check-in and check-out the rental equipment quickly.

BACKGROUND OF THE INVENTION

The conventional procedures for renting an automobile often turn into slow, frustrating experiences for a rental customer. These undesirable experiences result, at least in part, from the relatively large amount of information that must be exchanged between the rental customer and, for example, an automobile rental agency. An exchange of a larger amount of information causes a rental transaction to require a greater period of time. Moreover, rental agencies are encouraged to minimize the number of personnel available to engage in exchanging such information in order to hold operating costs as low as possible. Thus, rental customers often wait until rental agency personnel are available before a rental agreement transaction commences.

This problem is aggravated around airports. Commercial air travelers represent a substantial class of rental agency customers. Moreover, commercial air flights tend to be concentrated around common times of the day so that a large number of rental customers appear at a rental agency at once. Consequently, many customers are forced to wait in long lines before they can receive a rental automobile.

For a rental customer, any waiting period is typically an unproductive, unwanted, and frustrating time. In connection with planning an itinerary which involves both commercial air travel and rental of an automobile, time must be allotted for potential delays in renting an automobile, in addition to potential delays associated with commercial air travel. The sum of such potential delays often causes a rental customer to take earlier flights than would otherwise be required if a relatively certain, minimal delay to rent an automobile could be reasonably expected. Consequently, minimization of waiting time improves the rental agreement transaction and improves efficiency in allocating a rental customer's time.

In fact, many rental and travel agencies have established procedures which attempt to minimize this waiting time. However, such procedures often rely on making prior arrangements for specific automobiles and on utilizing the same rental agency personnel who must engage in obtaining information from many rental customers. Consequently, such procedures often fail to adequately minimize delay due to mistakes, overloading of rental agency personnel, or to a lack of an opportunity to make such prior arrangements in a customer's busy schedule.

In addition, rental agencies are now installing cellular mobile radiotelephones (CMRs) in rental automobiles so that their customers may purchase CMR services. Such CMRs are often equipped with a device which reads credit or charge cards and with the requisite intelligence to process credit-card payment of CMR service, so that the customer may accept billing and accounting responsibility prior to being provided with the CMR service. However, heretofore credit-card CMRs installed in rental automobiles have not been useful to aid in transferring the information required by a rental transaction. Consequently, they currently fail to help in minimizing the undesirable delays currently experienced by rental customers.

SUMMARY OF THE INVENTION

Accordingly, it is a advantage of the present invention that a system is provided which utilizes CMR equipment to exchange information required in a rental transaction so that rental customer delays are minimized.

Another advantage of the present invention is that a system for quickly generating a complete written rental contract form with a minimal amount of rental agency personnel involvement is provided.

Yet another advantage is that the present invention provides a system which quickly generates a rental contract receipt with a minimal amount of rental agency personnel involvement.

The above and other advantages of the present invention are carried out in one form by a system which generates written documents for the rental of equipment. A cellular mobile radiotelephone (CMR) and a card reader are installed in the equipment. The CMR couples to a switching network and to an internal transient use processor (TUP). The switching network additionally couples to a system administration computer (SAC) and to a lot control computer (LCC). The LCC includes a printing device. The TUP is programmed to obtain identification information from a previously programmed card which is read by the card reader, to obtain a first set of contract parameters entered from a keypad of the CMR, and to cause the CMR to transmit, through the switching network to the SAC, the identification information and first set of contract parameters. The SAC is programmed to send voice prompts through the switching network to the CMR, to receive the identification information and first set of contract parameters from the TUP, to access a personal profile database and obtain a second set of contract parameters therefrom, and to send, to the LCC, the first and second sets of contract parameters for the printing of a written contract form at the printing device.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1 shows a system level illustration of the present invention;

FIG. 2; shows a block diagram of a cellular mobile radiotelephone (CMR) utilized in the present invention;

DETAILED DESCRIPTION OF THE PREFERRED EMBODIMENT

Figure 3A:
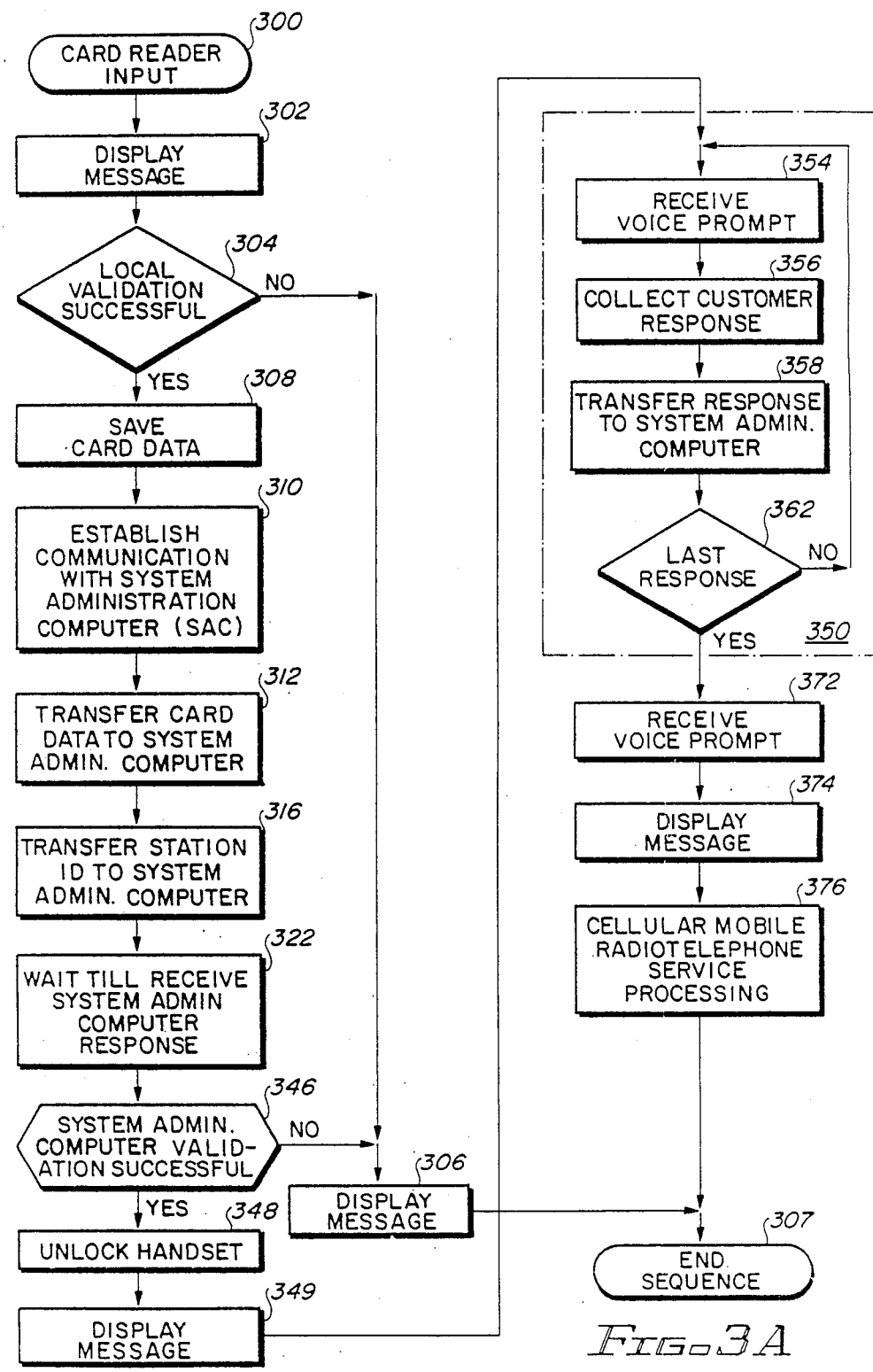
FIG. 3A shows a simplified flow chart of tasks performed by a transient use processor (TUP) of the present invention during a check-out procedure.

FIG. 1 illustrates an equipment rental system 10 organized in accordance with the present invention. As shown in FIG. 1, a rental agency or other entity which rents equipment, such as automobiles 12a and 12b, has established a rental car lot 14 to hold automobile 12a, which is available for renting by a customer. Automobile 12b represents equipment which is currently rented, or for which a rental contract is currently open. Automobile 12b resides outside of lot 14. Each of automobiles 12 includes a fuel tank 13. Although the preferred embodiment of the present invention illustrates rental equipment 12a and 12b as representing automobiles, those skilled in the art will understand that the inventive concept of the present invention is not limited thereto.

FIG. 1 additionally shows a drive-through booth 26 located adjacent to both an entrance 28 of rental car lot 14 and to an exit 30 of rental car lot 14. Drive-through booth 26 incorporates barricades 32a and 32b to control entry into and exit from, respectively, rental car lot 14. In addition, booth 26 includes prominently displayed signs 33 installed thereon. However, signs 33 may be duplicated as necessary to provide easily visible information and instructions to customers of system 10. Moreover, a lot control computer (LCC) 34 physically resides in booth 26. LCC 34 is a conventional computer or microprocessor device, which in the preferred embodiment is configured to include a processor 36, a modem 38, a keypad 40, and a printer 42. However, an alternate embodiment contemplates the use of a computer configured simply to interface printer 42 to a data communications port. In the preferred embodiment a rental agency employee (not shown) is stationed in booth 26 to assist in the operation of system 10.

In accordance with the preferred embodiment, each of automobiles 12a and 12b are equipped with a charge card cellular mobile radiotelephone (CMR) 16 in a manner well understood by those skilled in the art. A rental equipment customer may communicate from an automobile 12 using CMR 16. A radio frequency transmission between an antenna 18 installed on each automobile 12 and a cellular base station antenna 20, which couples to a cellular base station 22, electromagnetically couples a CMR 16 to cellular base station 22. Those skilled in the art will recognize that, in addition to the CMRs 16 installed in automobiles 12, many additional CMR units, such as units 24, may communicate with cellular base station 22.

Cellular base station 22 along with a mobile telephone switching office (MTSO) 44 and a public switching telephone network (PSTN) 46 together comprise a communications switching network 48 which the present invention utilizes. Cellular base station 22 couples to MTSO 44 through a first trunk 50. A second trunk 50 couples MTSO 44 to PSTN 46, and additional trunks 50 couple MTSO 44 to other components (not shown) of switching network 48. PSTN 46 couples to still other components (not shown) of switching network 48 using still other trunks 50. Of course, those skilled in the art will understand that PSTN 46 may incorporate any number of exchanges or local switching offices.

In addition, PSTN 46 has a multiplicity of subscriber lines 52. In the preferred embodiment of the present invention, one of subscriber lines 52 couples PSTN 46 to a system administration computer (SAC) 54. Although the MTSO is shown in FIG. 1 to be coupled through the PSTN and a single subscriber line 52 to SAC 54, it is understood that, depending on the physical location of SAC 54, connection of MTSO 44 to SAC 54 may require the facilities of an interexchange carrier. SAC 54 represents a conventional computer, such as an IBM PC/XT/AT or the like. SAC 54 interfaces to subscriber line 52 through the use of a communication port and a modem (not shown), in a manner well understood by those skilled in the art. Moreover, SAC 54 is characterized in the present invention by being configured with a conventional memory 56, which stores programming instructions that control the operation of SAC 54, and a conventional voice card 58, which stores and selectively recalls prerecorded verbal audio messages for transmission on subscriber line 52.

As shown in FIG. 1, a second subscriber line 52 couples an inventory database 60 to PSTN 46, and a third subscriber line 52 couples a personal profile database 62 to PSTN 46. Databases 60 and 62 each represent conventional memory structures which are configured to store information that is specifically utilized in accordance with equipment rental system 10. However, those skilled in the art will recognize that databases 60 and 62 may additionally incorporate processors and appropriate interfacing circuitry (not shown) so that SAC 54 may access databases 60 and 62, retrieve data therefrom, and manipulate data stored therein.

Inventory database 60 includes records which describe automobiles 12a and 12b. For example, such records may advantageously be coded to indicate a last known location for automobiles 12a and 12b, a complete physical description of automobiles 12a and 12b, a general rate classification for automobiles 12a and 12b, such as luxury, intermediate, economy, etc., maintenance information, and a description of the general physical condition of automobiles 12a and 12b.

Personal profile database 62 includes records which relate to customers of equipment rental system 10. Such records are created prior to a customer's use of system 10 to rent an automobile. These records may advantageously include data which describes the customer's driver's license number and state or jurisdiction issuing such driver's license. It additionally includes information detailing a preferred payment method. This payment method information may advantageously include a list of credit-card or corporate accounts which are to be debited in order to pay for rental charges. In addition, personal profile database 62 may advantageously include information which describes desired insurance coverage (or insurance coverage waivers) to be included in a rental contract and classes of automobiles, such as luxury, intermediate, etc., which may be rented using equipment rental system 10.

Fourth and fifth subscriber lines 52 couple PSTN 46 to a CMR administration processor 64 and a billing processor 66, respectively. CMR administration processor 64 establishes cellular services. Such systems are known to those skilled in the art and need not be discussed herein. A system for providing CMR service via a credit-card CMR is described in detail in U.S. Pat. No. 4,776,003, entitled "Cellular Mobile Radio Credit Card System," and in U.S. Pat. No. 4,777,646, entitled "Communication System," both by Arlene J. Harris as inventor. These U.S. patents are incorporated herein by reference. Billing processor 66 is responsible for accounting and billing in connection with rental transactions. Billing processor 66 debits appropriate accounts to receive payments for rental of equipment, and supplies records of rental transactions to customers.

A sixth one of subscriber lines 52 couples PSTN 46 to LCC 34, at modem 38 thereof. Of course, other ones of subscriber lines 52 couple PSTN 46 to conventional telephone stations, such as station 68, and to other telecommunication devices.

As an alternative to coupling SAC 54, databases 60 and 62, and processors 64 and 66 together through PSTN 46, two or more of such components may be physically located together and coupled together through a common bus. Moreover, the present invention contemplates the location of such components so that they couple together through a privately owned local area network (LAN). Still further, nothing in the present invention prevents the location of LCC 34 with or near SAC 54, so that LCC 34 may be in data communication with SAC 54 through an appropriate private data communications channel. Such alternate data communication arrangements are illustrated in FIG. 1 by data communication channel 70, shown as a dotted line, which couples each of SAC 54, databases 60 and 62, and processors 64 and 66 together.

Consequently, in the present invention, a CMR 16 is in data communication with SAC 54 through switching network 48, SAC 54 is in data communication with databases 60 and 62 either through switching network 48 or communication channel 70, SAC 54 is additionally in data communication with CMR administration processor 64 and billing processor 66 either through switching network 48 or through communication channel 70, and SAC 54 is in data communication with LCC 34 either through switching network 48 or another data communication channel (not shown). Therefore, communication links exist for the management and acquisition of information which is required in forming rental agreements.

Credit-card CMR 16, which is installed in each of automobiles 12a and 12b, serves as one of the many key components of equipment rental system 10. FIG. 2 shows a block diagram of CMR 16. As shown in FIG. 2, CMR 16 includes a handset 210 which incorporates a keypad 212. Handset 210 houses audio transducers (not shown) for transmitting and receiving audio. Handset 210 couples to a handset control circuit 214, which controls operation of handset 210. Control circuit 214 couples to a station set processor 216, which controls operation of CMR 16 in a manner which is conventional for cellular communication services. Station set processor 216 couples to a cellular transceiver 218, and cellular transceiver 218 couples to antenna 18. Cellular transceiver 218 converts electrical signals into electromagnetic radiation, and vice versa, for communication with cellular base station 22 (see FIG. 1). Components 210 through 218 and antenna 18 together represent a standard cellular mobile radiotelephone 220. Standard cellular mobile radiotelephone 220 forms the conventional type of cellular equipment which is commonly installed in private automobiles and other equipment.

However, credit-card CMR 16 in the present invention includes additional components which specifically adapt standard cellular mobile radiotelephone 220 for use in connection with rental equipment such as automobiles 12a and 12b (see FIG. 1). Specifically, CMR 16 includes a transient use processor (TUP) 222 which couples to station set processor 216. TUP 222 manages information which specifically relates to the transient nature of using cellular equipment in connection with short-term rentals. The scope of the present invention encompasses implementing TUP 222 using the same physical circuits which are used to implement station set processor 216 or implementing TUP 222 using separate circuits. Regardless, a modem 224, or the equivalent, couples to TUP 222 and to cellular transceiver 218. Modem 224 converts data communications into a form acceptable for transmission by cellular transceiver 218 in a manner well understood by those skilled in the art and may advantageously be located with TUP 222 in an integral unit.

TUP 222 additionally couples to a memory 226. Memory 226 includes both a permanent memory portion 228 and a temporary memory portion 230. Permanent memory portion 228 stores programming instructions which control the operation of TUP 222. Temporary memory 230 stores data which change during operation of CMR 16. In addition, TUP 222 couples to a display 232, which visually conveys information to a customer of equipment rental system 10.

A card reader 234 additionally couples to TUP 222. Card reader 234 reads data stored on a card, such as card 236, and transfers such data to TUP 222. In the preferred embodiment, card 236 includes a magnetic strip that has been previously programmed to store identification information. Card 236 represents the type of card which is commonly referred to as a charge card and is typically of a convenient size for carrying in a customer's wallet or purse. Moreover, in the preferred embodiment, card 236 is specifically dedicated to equipment rental system 10. In other words, major credit cards and other non-dedicated cards will not work in connection with equipment rental system 10. The use of a dedicated card for equipment rental system 10 provides a security feature and shortens time required to search and retrieve records from databases.

External sensors 238 also couple to TUP 222. External sensors 238 include switches which indicate whether a door may be open or whether an ignition is turned on. In alternative embodiments of the present invention, external sensors 238 include devices which automatically measure a quantity of fuel contained in fuel tank 13 (see FIG. 1), measure mileage or another quantity-of-use indicator, and/or detect the location of automobiles 12 through the use of a global position system (GPS) or other locating means.

For purposes of the present invention, station set processor 216 controls and operates standard cellular mobile radiotelephone 220 in a manner well known and understood to those skilled in the art. However, TUP 222 is operated in accordance with the requirements of equipment rental system 10 (see FIG. 1).

Figure 3B:
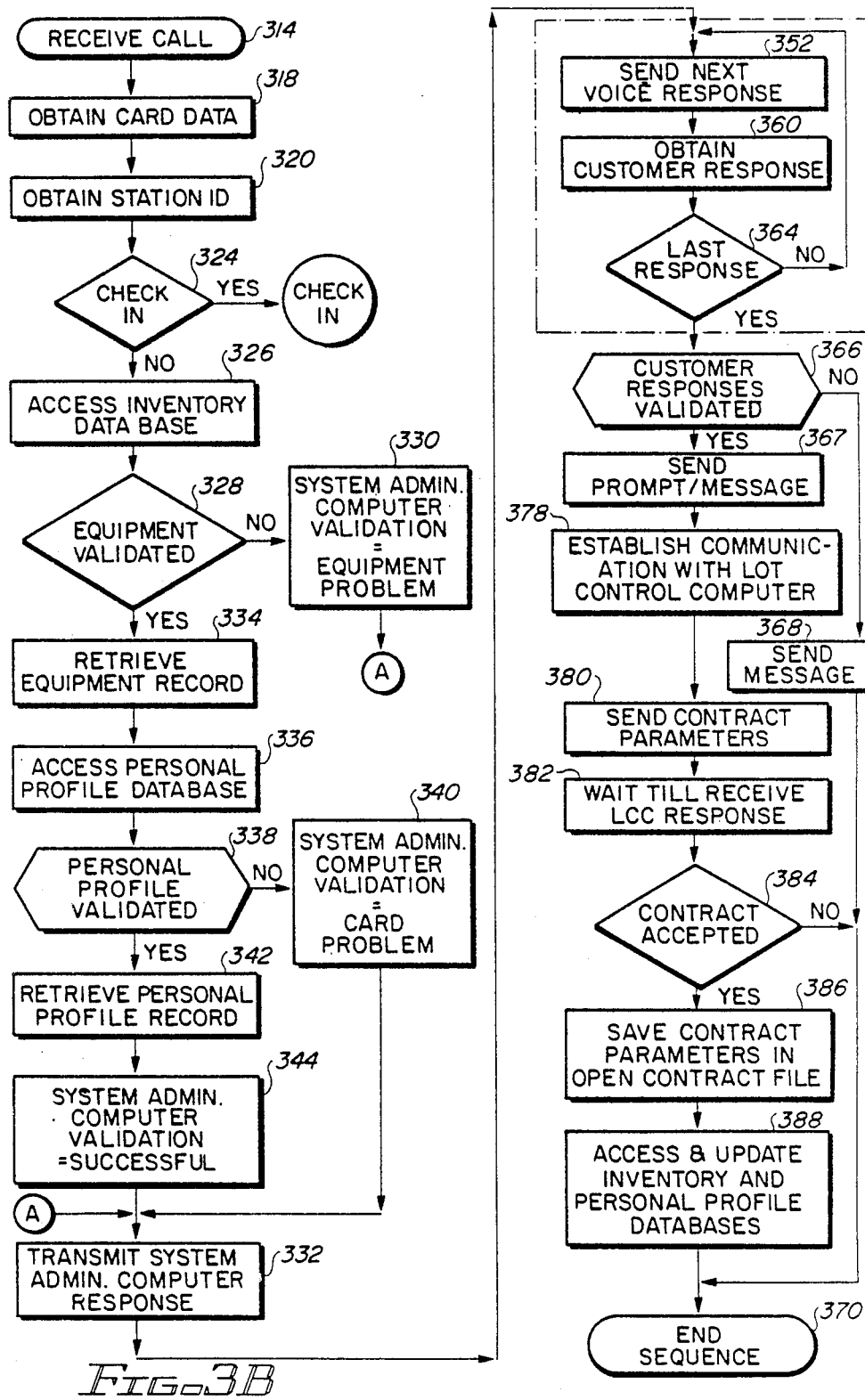
FIG. 3B shows a simplified flow chart of tasks performed by a system administration computer (SAC) of the present invention during the check-out procedure.

FIGS. 3A and 3B together illustrate various tasks that are performed by equipment rental system 10 during a check-out procedure. A check-out procedure occurs during the process of renting automobile 12a (see FIG. 1). In other words, the check-out procedure encompasses the activity of engaging in a rental agreement for the temporary use of automobile 12a. FIG. 3A specifically shows tasks performed by TUP 222 (see FIG. 2) while FIG. 3B shows tasks specifically performed by SAC 54 (see FIG. 1). Since the tasks shown in FIGS. 3A and 3B operate cooperatively with one another, the check-out procedure is described below with simultaneous reference to both FIGS. 3A and 3B.

A rental customer initiates the check-out procedure. When the customer arrives at rental car lot 14 (see FIG. 1), the customer goes to automobile 12a within rental car lot 14. Automobile 12a may be selected from a multiplicity of available automobiles (not shown) in accordance with the customer's wishes. In the preferred embodiment, keys for automobile 12a are located in automobile 12a at this point in the procedure, and automobile 12a is unlocked. Consequently, the customer may quickly and easily select automobile 12a, enter automobile 12a, and turn on the ignition. Once this has occurred, instructions displayed on display 232 (see FIG. 2) and on signs 33 (see FIG. 1) tell the customer to insert the specialized card (card 236) into card reader 234.

As shown in FIG. 3A, the tasks performed by TUP 222 substantially begin when TUP 222 receives data from card reader 234. This condition is indicated at start block 300. The information received at start block 300 represents personal identification information which has been programmed onto card 236, such as the customer's name and an expiration date for card 236. In addition, such data include a code which is interpreted as being uniquely related to equipment rental system 10. Once this information has been received, TUP 222 (see FIG. 2) displays a message at display 232 which informs the customer that equipment rental system 10 is currently checking the customer's card, as shown at a task 302.

Next, in a task 304, TUP 222 performs a local validation on card 236 before proceeding. This local validation checks to see whether card 236 represents the correct type of card and whether the card has expired. If card 236 is an incorrect card for equipment rental system 10 or if the card has expired, then the local validation is not successful. When local validation is not successful, TUP 222 displays a message, in a task 306, which informs the customer that a check-out procedure problem has occurred and that the customer must utilize alternate procedures for renting automobile 12a (see FIG. 1). After such a message has been displayed, TUP 222 simply ends the sequence, as shown at block 307.

However, assuming the local validation of task 304 is successful, which is the normal situation, TUP 222 performs a task 308. Task 308 saves the identification information from card 236 in temporary memory 230 (see FIG. 2). Next, TUP 222 establishes data communication with SAC 54 (see FIG. 1), as shown at a task 310. Such data communication may advantageously be established by dialing, or sending, a predetermined telephone number through cellular transceiver 218 (see FIG. 2) to switching network 48 (see FIG. 1) so that connecting circuits associated with switching network 48 form a connection to SAC 54. Once a connection has been completed, appropriate hand shaking signals may be exchanged using a common predetermined data communication protocol to permit TUP 222 and SAC 54 to verify that a check-out procedure is underway. The present invention additionally contemplates provisions for redialing the predetermined telephone number and for dialing alternate telephone numbers if initial attempts at establishing data communications are unsuccessful.

TUP 222 proceeds to a task 312 once data communication has been established; and, SAC 54 then begins its portion of the check-out procedure, as shown at a block 314 in FIG. 3B. As shown in tasks 312 and 316 of FIG. 3A, TUP 222 transfers the identification data obtained from card 236 and station identification information to SAC 54. As discussed above, the card data uniquely identifies card 236 and the customer to whom card 236 belongs. The station identification information likewise represents information which uniquely identifies automobile 12a. Such station identification information may simply be the mobile identification number (MID) of CMR 16. As shown at tasks 318 and 320 in FIG. 3B, SAC 54 receives this card data and station identification information. After this identification information has been transferred to SAC 54, TUP 222 waits until a response is received from SAC 54, as shown in a task 322 (FIG. 3A).

While TUP 222 waits in task 322, SAC 54 determines whether the current procedure is a check-in or a check-out procedure, as shown at a task 324 (FIG. 3B). This determination may advantageously be accomplished by checking an open contracts file for records associated with the card data and station ID information received above in tasks 318 and 320. If the open contracts file contains no entries for such identification information, then the current procedure may be assumed to be a check-out procedure. However, if such an entry exists, a check-in procedure is indicated. The check-in procedure is described below in connection with FIG. 4.

Assuming that the current procedure is a check-out procedure, SAC 54 proceeds to a task 326, in which inventory database 60 (see FIG. 1) is accessed. Inventory database 60 may be accessed in a manner similar to that described above in connection with task 310 (FIG. 3A). Once inventory database 60 has been accessed, SAC 54 validates the equipment (i.e. automobile 12a), as shown at a task 328. In this validation SAC 54 may, for example, verify that inventory database 60 contains a record which describes automobile 12a, states that automobile 12a is currently available for renting, and states that automobile 12a is not currently scheduled for maintenance. If automobile 12a cannot be validated, a SAC validation variable is set to indicate that an equipment problem exists, as shown in a task 330, and this variable is transmitted back to TUP 222 in a task 332.

However, assuming that automobile 12a is validated, which represents the normal situation, a record which describes automobile 12a is retrieved from inventory database 60, as shown at a task 334, and SAC 54 next accesses personal profile database 62 (see FIG. 1) in a task 336. Task 336 operates in a manner similar to that described above in connection with task 326. Personal profile database 62 is investigated in a task 338 to validate a personal profile of a record indexed by data obtained above in task 318. Such a validation may, for example, consist of verifying that a record exists at a database location indexed by the card data which was obtained above in task 318, and verifying that the station identification information obtained above in task 320 is consistent with limitations on car classes contained in the record. In addition, this validation may, for example, check past transactions to determine if payment collection problems have been reported in connection with charge accounts indicated in the personal profile. Furthermore, this validation may, for example, check to see if the customer is currently listed as renting an automobile. If the personal profile cannot be validated, SAC 54 performs a task 340, which sets the SAC validation variable to indicate that a card problem has occurred, and then SAC 54 proceeds to task 332 to transmit this response to TUP 222.

Assuming that the personal profile is validated in task 338, which is the normal situation, SAC 54 retrieves the personal profile data record from personal profile database 62 in a task 342. This personal profile record contains information which lists the customer's driver's license number and jurisdiction, defines a rate schedule for renting various classes of automobiles, lists various insurance levels or waivers of insurance to be included in a rental contract, and lists preferred payment methods. For a typical corporate customer, the rate schedule may advantageously represent a specially negotiated corporate rate, and the payment method may indicate a corporate account with the rental agency. In addition, the payment method entry of the personal profile record contemplates the use of major credit card numbers arranged so that if a problem is obtained receiving payments from one source other payment sources may be utilized.

After retrieval of the personal profile record at task 342, SAC 54 sets the SAC validation variable to indicate a successful validation in a task 344 and then transmits this variable to TUP 222 at task 332. At this point in the check-out procedure, SAC 54 has obtained static parameters which are to be included in a written contract form. These static parameters for automobile 12a and the customer tend to remain constant over several rental agreements.

TUP 222 and SAC 54 next cooperate to obtain transient parameters, which tend to change from rental contract to rental contract. Referring back to FIG. 3A, TUP 222 stops waiting in task 322 when it receives the SAC validation variable and proceeds to a task 346, in which TUP 222 examines this variable to determine whether the validation was successful. If the validation procedure was not successful, TUP 222 performs task 306, which constructs an appropriate message to display to the customer. In this situation, such a message indicates that a validation problem has occurred and that the customer must use an alternate procedure in renting an automobile.

Assuming that TUP 222 determines that the validation is successful, which is the normal situation, TUP 222 unlocks handset 210 (see FIG. 2) in a task 348 and then displays instructions to the customer in a task 349. The unlocking of handset 210 may occur in response to a specific command issued by SAC 54 or may result exclusively from programming instructions for TUP 222. The message displayed at task 349 instructs the customer to pick up handset 210 and follow instructions audibly presented to the customer thereon.

SAC 54 and TUP 222 cooperate to issue audible instructions to the customer and obtain responses from the customer. TUP 222 utilizes a procedure 350 (FIG. 3A) while SAC 54 utilizes a procedure 351 (FIG. 3B). The customer responses provide SAC 54 with the dynamic parameters, discussed above. Specifically, SAC 54 initiates procedure 351 by sending a voice prompt, in a task 352 (FIG. 3B), to CMR 16 (see FIG. 2). TUP 222 detects the voice prompt in a task 354 (FIG. 3A). The voice prompt represents an audible message which has been prerecorded and programmed for use by SAC 54 utilizing voice card 58 (see FIG. 1). After the voice prompt instruction has been issued, TUP 222 next collects the customer's response to the voice prompt in a task 356 (FIG. 3A). The instructions presented in the voice prompt tell the customer to enter a specific data item using keypad 212 on handset 210 (see FIG. 2). After the customer has responded to the voice prompt, TUP 222 next transfers the customer's response back to SAC 54 in a task 358 (FIG. 3A), and SAC 54 obtains this customer response in a task 360 (FIG. 3B). TUP 222 and SAC 54 next determine whether or not the previous customer response represented the last response in tasks 362 (FIG. 3A) and 364 (FIG. 3B), respectively. If the last response is not the final response, SAC 54 loops back to task 352, and TUP 222 loops back to task 354, so that a subsequent response may be obtained.

A voice prompt generally refers to a specific item of information that the customer is requested to provide. In the preferred embodiment voice prompts are used to request the customer to indicate when the customer is ready to begin, to indicate the mileage on the automobile being rented, and to indicate the location of rental car lot 14 (see FIG. 1) by entering a number from sign 33 (see FIG. 1). In addition, responses from the customer provide information related to the approximate state of fuel tank 13 (see FIG. 1). This approximate state roughly describes the amount of fuel contained in automobile 12a. In addition, a response may provide a general indication of the physical condition of automobile 12a or whether automobile 12a shows obvious damage. After all required transient parameters have been obtained by SAC 54, a subsequent voice prompt repeats the previously entered dynamic parameters to the customer and instructs the customer to verify whether such dynamic parameters are correct.

In the alternate embodiments discussed above in connection with sensors 238 in FIG. 2, many or all of the transient parameters may be provided by CMR 16 automatically through the use of sensors 238. In such embodiments, voice prompt procedures 350 (FIG. 3A) and 351 (FIG. 3B) may be omitted or modified so that such transient parameters are repeated to the customer while the customer is requested to verify the accuracy of such parameters as a response.

When all transient parameters have been obtained, SAC 54, in a task 366 (FIG. 3B), validates the customer responses, or transient parameters, by checking to see whether such responses are consistent with records obtained from inventory database 60 (see FIG. 1) and personal profile database 62 (see FIG. 1). Situations resulting in an invalidation may, for example, result from automobile 12a being listed in inventory database 60 as residing in a lot other than the lot indicated by the customer. Moreover, the customer may have responded to voice prompts in such a manner that indicated a desire to change a static parameter contained in the personal profile database in a manner which cannot be permitted. Such a situation may occur when a customer requests to rent an automobile of a class, such as a luxury class, which the customer's corporate employer wishes to discourage. If the customer responses are not validated in task 366, SAC 54 sends an appropriate message to TUP 222 in a task 368, and ends its processing sequence, as shown at a block 370.

Assuming that the customer responses are validated in task 366, SAC 54 sends another voice prompt and/or message to TUP 222 in a task 367. The voice prompt sent by SAC 54 in task 367 is received by TUP 222 in a task 372, shown in FIG. 3A. This voice prompt instructs the customer to hang up handset 210, to drive to drive-through booth 26 (see FIG. 1), to ready the customer's drivers' license for inspection, and to receive and sign a written contract form from the operator in booth 26. In addition, TUP 222 may advantageously display a message which is consistent with such instructions at a task 374. Such a display may be continuously viewed by the customer so that the customer can easily comply with all components of such instructions. At this point in the check-out procedure, TUP 222 has essentially finished its portion of the check-out procedure tasks. However, as indicated in a task 376, TUP 222 may be employed to establish CMR service processing through communication with CMR administration processor 64 (see FIG. 1). One technique for implementing such CMR services is described in U.S. Pat. No. 4,776,003 and U.S. Pat. No. 4,777,646, referred to above and incorporated herein by reference.

After SAC 54 validates the customer responses and sends a voice prompt and/or message in tasks 366 and 367 (FIG. 3B), SAC 54 continues the check-out procedure by performing a task 378. In task 378, SAC 54 establishes data communication with LCC 34 (see FIG. 1). The establishment of communication with LCC 34 may advantageously occur in a manner similar to that discussed above in connection with task 310 (FIG. 3A) utilizing switching network 48. Next, SAC 54 sends the validated static and dynamic contract parameters to LCC 34 in a task 380.

Although not specifically shown, in the preferred embodiment LCC computer 34 receives these static and dynamic parameters, formats the parameters for printing in appropriate blank spaces on a written contract form at printer 42, and causes a completed written contract form to be printed at printer 42. While the contract form is being printed, the customer has driven to drive-through booth 26 and halted at barricade 32b (see FIG. 1). The rental agency operator stationed in booth 26 presents the completed written contract form to the customer for the customer's signature. In addition, the operator may inspect the customer's driver's license to verify a match between the customer's actual driver's license and the driver's license information printed on the written contract form. At this point in the preferred embodiment of the present invention, the customer has the opportunity of accepting the contract by signing it or rejecting the contract. Assuming the customer accepts the contract, the booth operator then enters an appropriate response at keypad 40 (see FIG. 1) of LCC 34, and this response is transmitted back to SAC 54. In addition, after the customer signs the contract, the operator removes barricade 32b so that the customer may drive automobile 12a out of rental lot 14.

As shown in FIG. 3B, SAC 54 waits at a task 382 to receive this response from LCC 34 and then examines the response in a task 384 to determine whether or not the customer accepted the contract. If the customer refused to accept the contract, SAC 54 ends the sequence, as indicated at block 370. However, assuming the customer accepts the contract, which is the normal situation, SAC 54 proceeds to a task 386 in which the static and dynamic contract parameters are saved in the open contracts file, discussed above in connection with task 324. After task 386, SAC 54 performs a task 388, in which SAC 54 again accesses inventory and personal profile databases 60 and 62 (see FIG. 1), and updates the appropriate records therein to indicate the current rental contract which is now open. After task 388 SAC 54 has completed its portion of the check-out procedure, as indicated at end block 370.

Automobile 12b, located at entrance 28 of rental car lot 14 in FIG. 1, illustrates the check-in procedure, which begins when the customer returns rented automobile 12b to rental car lot 14. In order to check-in automobile 12b, a "check-in equipment event" must occur and be detected. In the preferred embodiment, a check-in equipment event occurs when the customer again causes card 236 (see FIG. 2) to be read by card reader 234. The customer is instructed to do this by information contained on one of signs 33 (see FIG. 1). However, the present invention also recognizes a check-in equipment event as occurring when a customer enters a special code at keypad 212 on handset 210 of CMR 16 (see FIG. 2).

Figure 4:
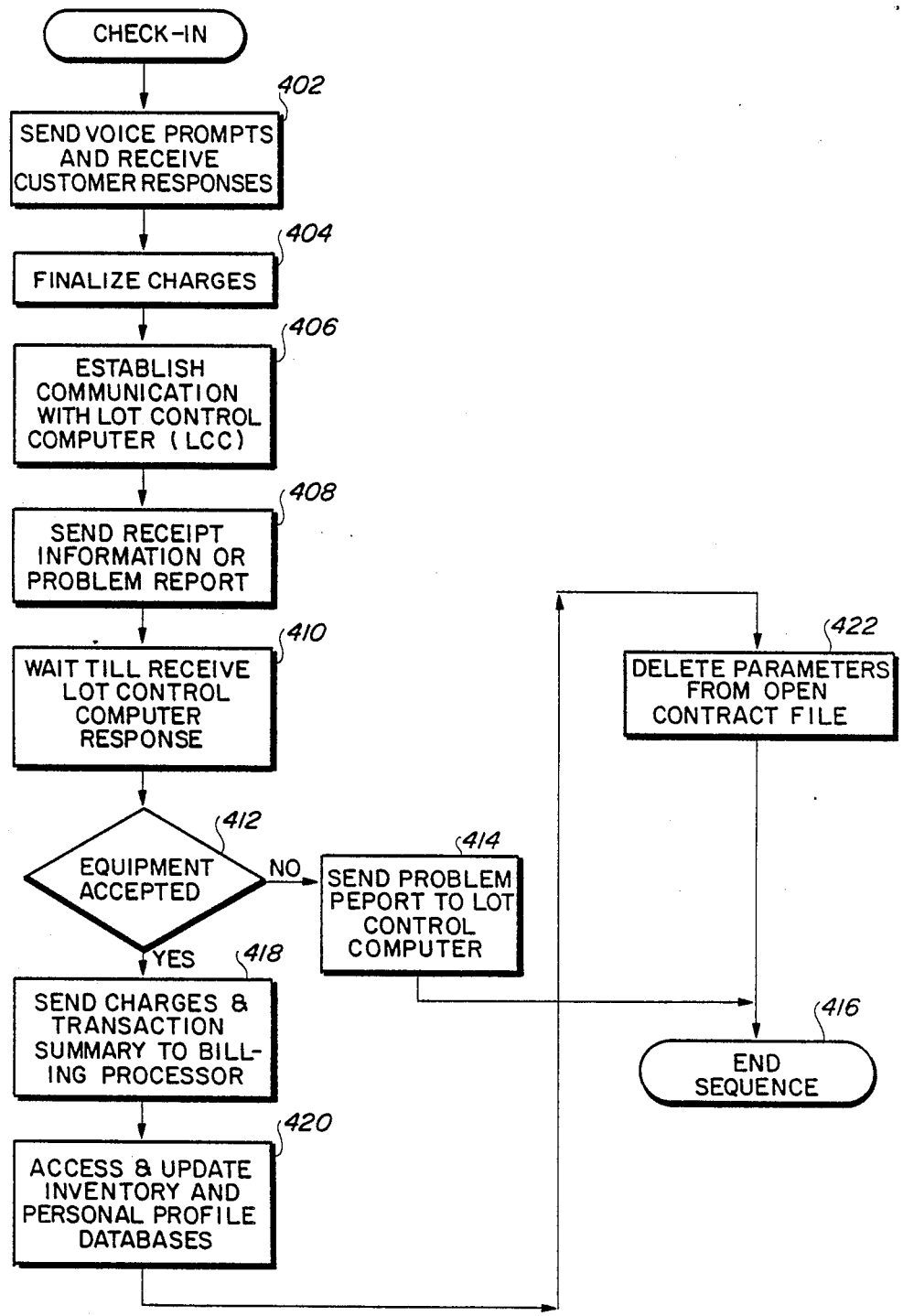
FIG. 4 shows a simplified flow chart of tasks performed by the SAC of the present invention during a check-in procedure.

Assuming that the reading of card 236 by card reader 234 serves as the check-in equipment event, TUP 222 subsequently performs tasks similar to those shown in tasks 300 through 310 of FIG. 3A and discussed above. However, when a special code is used to cause a check-in equipment event, block 300 (FIG. 3A) obtains card data from temporary memory 230 (see FIG. 2) rather than from card 236. Likewise, SAC 54 performs tasks similar to those shown in steps 314 through 324 of FIG. 3B. In the check-in procedure, task 324, which examines the open contracts file, detects that a contract is open for the card data and station identification data obtained previously in steps 318 and 320, respectively. However, if a special code is used to cause a check-in equipment event, a special code passed to SAC 54 may indicate the request of a check-in procedure to task 324 to reduce processing time. Consequently, SAC 54 then proceeds to a task 402, which is shown in FIG. 4.

Task 402 performs a procedure similar to that shown at procedure 351 of FIG. 3B. This procedure cooperates with a procedure performed by TUP 222 that is similar to procedure 350 (FIG. 3A). In task 402 SAC 54 cooperates with TUP 222 in the sending of voice prompts to CMR 16 (see FIG. 2) and in receiving customer responses. However, the instructions and responses contemplated by procedure 402 provide concluding contract parameters in the check-in procedure. These concluding contract parameters identify the amount of use seen by automobile 12b. For example, the amount of use may be indicated by the current mileage shown on an odometer (not shown) of automobile 12b at the check-in point. In addition, such responses request the customer to enter an indication of the approximate state of fuel tank 13 on automobile 12b, and of the general condition of automobile 12b. In task 402 the customer is again requested to respond with a lot number for rental car lot 14 (see FIG. 1) so that equipment rental system 10 may again know the location of automobile 12b. In a manner similar to that discussed above, after all concluding contract parameters have been received by SAC 54, SAC 54 repeats such parameters back to the customer and sends a voice prompt to the customer requesting the customer to verify that the concluding contract parameters are correct.

In the alternate embodiments of the present invention discussed above in connection with sensors 238 of FIG. 2, many or all of the concluding contract parameters are supplied to SAC 54 automatically by CMR 16. For example, such alternative embodiments automatically sense one or more of fuel tank capacity, milage driven or time automobile 12b has been operated, and the location of automobile 12b. Consequently, in these alternative embodiments, task 402 may be altered to omit voice prompts or to modify voice prompts to repeat automatically measured data and request a verification response.

After task 402, SAC 54 has obtained sufficient concluding contract parameters to calculate charges accrued by the customer during the rental contract period. These charges are finalized in a task 404. After task 404, SAC 54 performs a task 406 which establishes communication with LCC 34 (see FIG. 1). Task 406 uses the same procedures to establish communication as are used in task 378 (FIG. 3B). Next, SAC 54 normally sends the finalized charges and additional information to be included on a receipt to LCC 34 in a task 408.

However, SAC 54 may send a problem report to LCC 34 during task 408. Such problem reports may be initiated when the concluding contract parameters provided by the customer indicate lot numbers or mileage figures which are probably inaccurate. Assuming that a problem report is not required, LCC 34 then formats the data which identify charges and other receipt information transmitted thereto during task 408 so that a written receipt is printed at printer 42. In the preferred embodiment the operator in booth 26 (see FIG. 1) then quickly inspects automobile 12b to get an indication whether the information is correct and presents the receipt to the customer.

As shown at a task 410, SAC 54 merely waits to receive a response from LCC 34 before proceeding. Assuming that the operator stationed in booth 26 accepts automobile 12b and that the customer accepts the receipt and charges indicated thereon, the operator transmits an appropriate message back to SAC 54 by entering a response at keypad 40 (see FIG. 1). This response is detected and examined by SAC 54 at a task 412. Task 412 determines whether automobile 12b was accepted. If automobile 12b was not accepted or the receipt not accepted by the customer, then a problem report is sent to LCC 34 in a task 414, and SAC 54 ends the check-in sequence, as shown at block 416. Such a problem report sent to LCC 34 during task 414 may advantageously include the entire open file record for the current rental transaction so that the operator stationed in drive-through booth 26 can then take appropriate steps to resolve any disputes. However, assuming that automobile 12b is accepted as detected by task 412, which is the normal situation, the booth operator may remove barricade 32a so that the customer may enter rental car lot 14. As far as the customer is concerned, the rental transaction has been completed.

Next, SAC 54 performs a task 418. In task 418, SAC 54 sends the charge information and a summary of the rental transaction to billing processor 66 (see FIG. 1). The transmittal of such information may require the establishment of a data communication channel through switching network 48, as discussed above. Billing processor 66 then causes the accounts indicated in the personal profile database to be debited in accordance with the charges. In addition, billing processor 66 maintains the records of the transaction so that such records may be sent to the persons responsible for paying such charges. After task 418, SAC 54 performs a task 420, in which SAC 54 again accesses inventory and personal profile databases 60 and 62 (see FIG. 1) and updates such databases to indicate that automobile 12b is again located in a particular rental car lot and perhaps available for renting. After task 420, SAC 54 deletes all static, dynamic, and concluding contract parameters from the open contracts file, as shown in a task 422, and then ends the check-in sequence, as shown at block 416.

In summary, the present invention provides an equipment rental system which utilizes CMR equipment to exchange information required in a rental transaction. Consequently, the customer's anticipated delay in renting such equipment is greatly reduced. Moreover, a completed written contract form may be presented to the customer without requiring extensive assistance of rental agency personnel. Likewise, a rental record receipt may be presented to the customer without requiring extensive involvement by rental agency personnel. The use of cellular equipment to enter rental contract information as opposed to the use of rental agency personnel speeds up the rental transactions, and thereby allows a more efficient use of the customer's time.

The present invention has been described above with reference to a preferred embodiment. However, those skilled in the art will recognize that changes and modifications may be made in this preferred embodiment without departing from the scope of the present invention. For example, the tasks shown herein as being performed by a specific processor or computer may be shifted by those skilled in the art to be performed by other ones of the computers and processors. Moreover, those skilled in the art can devise alternate tasks to achieve the same functions described herein. One example of such alternate tasks would be the sending of complete contract and receipt language from SAC 54 to LCC 34 for printing at booth 26 (see FIG. 1) rather than sending mere variables to be formatted and printed in blanks on existing printed forms. Alternately, SAC 54 may send variables and formatting information for printing at booth 26, leaving processor 36 (see FIG. 1) to operate merely as an interface between printer 42 and SAC 54. These and other changes and modifications which are obvious to those skilled in the art are intended to be included within the scope of the present invention.

What is claimed is:

1. A system for generating written documents for the rental of equipment having a cellular mobile radiotelephone (CMR) with a keypad and having a card reader coupled to said CMR, said CMR being coupled to a communications network, and said system comprising:
   a transient use processor (TUP) coupled to said CMR and to said card reader, said TUP being programmed to:
   (a) obtain identification information from a programmed card read by said card reader,
   (b) obtain a first set of contract parameters entered from said keypad, and
   (c) cause said CMR to transmit, through said communications network, said identification information and said first set of contract parameters;
   a printing device coupled to said communications network;
   a memory device configured to include a personal profile database; and
   a system administration computer (SAC), coupled to said communications network and in data communication with said memory device, said SAC being programmed to:
   (a) send, through said communications network to said CMR, voice prompts intended to request specific ones of said first set of contract parameters,
   (b) receive said identification information and said first set of contract parameters from said communications network,
   (c) obtain, from said personal profile database, a second set of contract parameters, and
   (d) send, to said printing device, said first and second sets of contract parameters for printing a written contract form at said printing device.

2. A system as claimed in claim 1 wherein said printing device forms one portion of a lot control computer which couples to said communications network.

3. A system as claimed in claim 1 wherein said TUP is integrated with said CMR into a single unit.

4. A system as claimed in claim 1 wherein: said TUP is additionally programmed to:
   (a) detect a check-in equipment event, and
   (b) cause said CMR to transmit, through said communications network to said SAC, concluding contract parameters that define fees for rental of said equipment; and
said SAC is additionally programmed to:
   (a) calculate, using said concluding contract parameters, charges due for rental of said equipment, and
   (b) send data which identify said rental charges to said printing device to print a written receipt for rental of said equipment at said printing device.

5. A system as claimed in claim 4 wherein said TUP is programmed to detect a check-in equipment event by receiving identification information from said card reader.

6. A system as claimed in claim 4 wherein said TUP is programmed to include data in said concluding contract parameters which identify amount of use of said equipment.

7. A system as claimed in claim 4 wherein said SAC is additionally programmed to transmit, prior to receiving said concluding contract parameters, a voice prompt through said communications network to said CMR to indicate a specific item of data which is thereafter to be keyed into said keypad.

8. A system as claimed in claim 1 wherein said equipment is an automobile having a fuel tank.

9. A system as claimed in claim 8 wherein said TUP is programmed to include, in said first set of contract parameters, data which identify an approximate state of said automobile fuel tank.

10. A system as claimed in claim 1 wherein said memory is configured so that associated with said identification information, said personal profile database includes:
   information which identifies a method of payment for rental of said equipment;
   information which identifies a rate schedule to be applied for rental of said equipment;
   information which identifies a level of insurance coverage to be included on said written contract form for rental of said equipment; and
   information which identifies a driver's license number and jurisdiction associated therewith for inclusion on said written contract form.

11. A system as claimed in claim 1 wherein:
   said SAC is programmed to send a voice prompt through said communications network to said CMR to request said first set of contract parameters; and
   said TUP is programmed to transmit data obtained from said keypad through said communications network to said SAC after said voice prompt.

12. A method of generating a written contract form for rental of equipment having a cellular mobile radiotelephone (CMR) coupled to a card reader, said method comprising the steps of:
   reading, at said card reader, a card programmed to contain identification information;
   sending, from said CMR to a communications network, a predetermined telephone number which is associated with a system administration computer (SAC);
   transferring said identification information from said CMR, through said communications network, to said SAC;
   obtaining, at said SAC, a first set of contract parameters from a personal profile database by using said identification information as an index into said personal profile database;
   transmitting from said CMR to said SAC a second set of contract parameters;
   sending said first and second sets of contract parameters from said SAC to a printing device located proximate said equipment; and
   printing said contract form for rental of said equipment at said printing device.

13. A method as claimed in claim 12 additionally comprising the step of programming said card to include data which uniquely associate said card with an equipment rental system.

14. A method as claimed in claim 12 additionally comprising the step of programming said card to uniquely identify a customer to whom said equipment is to be rented.

15. A method as claimed in claim 12 additionally comprising the step of attaching said CMR to an automobile.

16. A method as claimed in claim 12 additionally comprising the step of programming, prior to said reading step, said personal profile database with said first set of contract parameters.

17. A method as claimed in claim 16 wherein said programming step comprises the step of including, in said personal profile database, information which identifies a method of payment for rental of said equipment.

18. A method as claimed in claim 16 wherein said programming step comprises the step of including, in said personal profile database, information which identifies a rate schedule to be applied for rental of said equipment.

19. A method as claimed in claim 16 wherein said programming step comprises the step of including, in said personal profile database, information which identifies a level of insurance coverage to be included on said written contract form for rental of said equipment.

20. A method as claimed in claim 16 wherein said programming step comprises the step of including, in said personal profile database, information which identifies a driver's license number and jurisdiction associated therewith for inclusion on said written contract form.

21. A method as claimed in claim 12 wherein said transmitting step comprises the steps of:
   sending a voice prompt from said SAC to said CMR to request said second set of contract parameters; and
   transmitting data entered on a keypad of said CMR from said CMR to said SAC after occurrence of said voice prompt to provide said second set of contract parameters to said SAC.

22. A method as claimed in claim 21 wherein said transmitting data step comprises the step of coding said data so that said data identify a location for said equipment.

23. A method as claimed in claim 12 wherein said equipment is an automobile having a fuel tank, and said transmitting step comprises the step of including, in said second set of contract parameters, data which identify an approximate state of said automobile fuel tank.

24. A method of generating a written receipt of a completed contract for rental of equipment having a cellular mobile radiotelephone (CMR) associated therewith, said method comprising the steps of:

detecting entry of a check-in equipment event;

sending, from said CMR to a switching network after said detecting step, a predetermined telephone number which is associated with a system administration computer (SAC);

transferring identification information from said CMR, through said switching network, to said SAC;

transmitting, from said CMR to said SAC, concluding contract parameters that finalize charges for rental of said equipment;

calculating, at said SAC using said concluding contract parameters, charges due for rental of said equipment;

sending data which identify said rental charges from said SAC to a printing device located proximate said equipment; and printing said rental charge data in said written receipt for rental of said equipment at said printing device.

25. A method as claimed in claim 24 wherein said equipment additionally has a card reader coupled to said CMR, and said detecting entry step comprises the step of reading, at said card reader, a card programmed to contain said identification information.

26. A method as claimed in claim 24 wherein said transmitting concluding contract parameters step comprises the step of including, in said parameters, data which identify a location of said equipment.

27. A method as claimed in claim 24 wherein said transmitting concluding contract parameters step comprises the step of including, in said parameters, data which identify the degree of use of said equipment.

28. A method as claimed in claim 24 wherein said equipment is an automobile having a fuel tank, and said transmitting concluding contract parameters step comprises the step of including, in said parameters, data which identify an approximate state of said automobile fuel tank.

29. A method as claimed in claim 24 additionally comprising, prior to said transmitting concluding contract parameters step, the step of transmitting a voice prompt from said SAC to said CMR to indicate specific items of data which are to be thereafter keyed into a keypad associated with said CMR.

30. A method of generating a rental contract for rental of equipment having a credit-card-activated cellular mobile radiotelephone (credit-card CMR) associated therewith, said method comprising the steps of:

reading, at said credit-card CMR, a card programmed to contain identification information;

sending, from said credit-card CMR to a switching network, a predetermined telephone number which is associated with a system administration computer (SAC);

transferring said identification information from said credit-card CMR, through said switching network, to said SAC;

obtaining, at said SAC, a first set of contract parameters from a personal profile database by using said identification information as an index into said personal profile database;

transmitting from said credit-card CMR to said SAC a second set of contract parameters;

composing a rental contract; and printing said rental contract at a printing device located proximate said equipment.

31. A method as claimed in claim 30 additionally comprising the step of programming said card to uniquely identify a customer to whom said equipment is to be rented.

32. A method as claimed in claim 31 additionally comprising the step of programming, prior to said reading step, said personal profile database with said first set of contract parameters.

33. A method as claimed in claim 32 wherein said transmitting step comprises the steps of:

sending a voice prompt from said SAC to said credit-card CMR to request said second set of contract parameters; and transmitting data entered on a keypad of said credit-card CMR from said credit-card CMR to said SAC after occurrence of said voice prompt to provide said second set of contract parameters to said SAC.

34. A method of accruing charges under a rental contract for rental of equipment having a credit-card-activated cellular mobile radiotelephone (credit-card CMR) associated therewith, said method comprising the steps of:

detecting an equipment check-in event;

sending, from said credit-card CMR to a communications network after said detecting step, a predetermined telephone number which is associated with a system administration computer (SAC);

transferring identification information from said credit-card CMR, through said communications network, to said SAC;

transmitting, from said credit-card CMR to said SAC, concluding contract parameters that finalize charges for rental of said equipment; and calculating charges due for rental of said equipment.

35. A method as claimed in claim 34, said method comprising the additional step of:

sending data which specify said rental charges from said SAC to a printing device coupled to said SAC and located proximate a site where said equipment is returned.

36. A method as claimed in claim 35, said method comprising the additional step of:

printing said rental-charge data in a written receipt at said printing device.

37. A system for composing written documents pertaining to the temporary use of equipment that is associated with a card-activated cellular-mobile radiotelephone (CMR), the system comprising:

(a) a card-activated CMR comprising:
        (i) a cellular transceiver,
        (ii) a keypad coupled to the cellular transceiver,
        (iii) a transient use processor (TUP) coupled to the cellular transceiver, and
        (iv) a card reader coupled through the TUP to the cellular transceiver;

(b) a system administration computer (SAC) operable to be selectively coupled to the card-activated CMR for exchanging between the SAC and the card-activated CMR information used in processing a record of the temporary use of the equipment associated with the CMR;

(c) a printing device operable to be selectively coupled to the SAC; and (d) a personal profile database accessible by the SAC.

38. A system for composing written documents pertaining to the temporary use of equipment that is associated with a card-activated CMR as defined in claim 37 and wherein the TUP is programmed to:
  (a) obtain identification information from a programmed card read by the card reader,
  (b) obtain a first set of contract parameters entered from the keypad, and
  (c) cause the card-activated CMR to transmit, to the SAC, identification information and the first set of contract parameters.

39. A system for composing written documents pertaining to the temporary use of equipment that is associated with a card-activated CMR as defined in claim 38 and wherein the SAC is programmed to:
  (a) send to the card-activated CMR voice prompts intended to request specific ones of the first set of contract parameters,
  (b) receive the identification information and the first set of contract parameters,
  (c) obtain, from the personal profile database, a second set of contract parameters, and
  (d) send, to the printing device, the first and second sets of contract parameters for printing a written contract form at the printing device.

40. A system for composing written documents pertaining to the temporary use of equipment that is associated with a card-activated CMR as defined in claim 37 and wherein the SAC is programmed to:
  (a) send, through a switching network to the card-activated CMR, voice prompts intended to request specific ones of a first set of contract parameters,
  (b) receive identification information and the first set of contract parameters through the switching network,
  (c) obtain, from the personal profile database, a second set of contract parameters, and
  (d) send, to the printing device, the first and second sets of contract parameters for printing a written contract form at said printing device.

41. A system for composing written documents pertaining to the temporary use of equipment that is associated with a card-activated CMR as defined in claim 40 and wherein the printing device forms one portion of a lot control computer which couples to said switching network.

42. A system for composing written documents pertaining to the temporary use of equipment that is associated with a card-activated CMR as defined in claim 40 and wherein:
  the TUP is additionally programmed to:
    (a) detect a check-in equipment event, and
    (b) cause the card-activated CMR to transmit, to the SAC, concluding contract parameters that define fees associated with the temporary use of the equipment; and
  the SAC is additionally programmed to:
    (a) calculate, using the concluding contract parameters, charges due for the temporary use of the equipment.

* * * * *